July 7, 1959     C. T. BAYLISS     2,893,255
CHAIN OR BELT TENSIONING DEVICES

Filed May 9, 1957     2 Sheets-Sheet 1

Inventor
Cecil Thomas Bayliss

By *(signature)*
Patent Agent

July 7, 1959     C. T. BAYLISS     2,893,255
CHAIN OR BELT TENSIONING DEVICES
Filed May 9, 1957     2 Sheets-Sheet 2
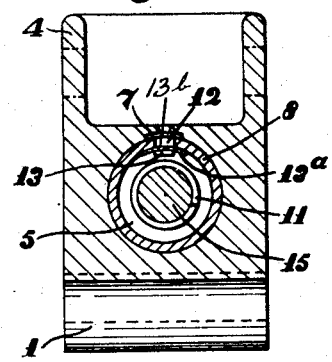
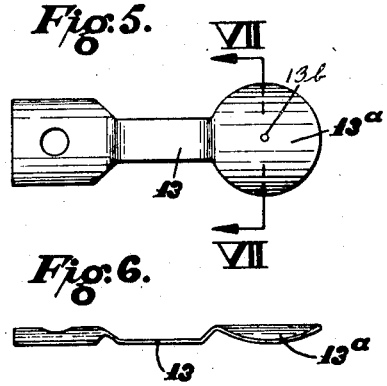
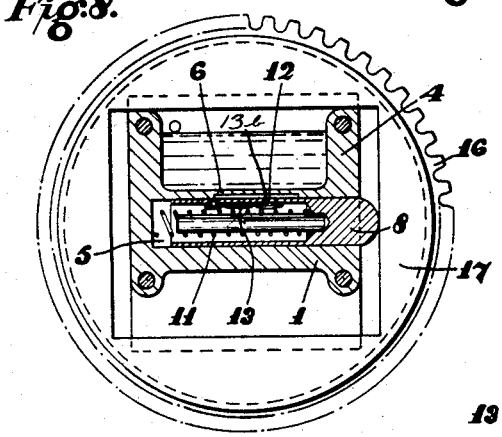
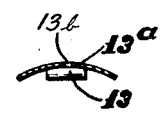
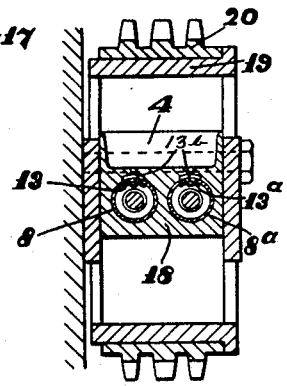
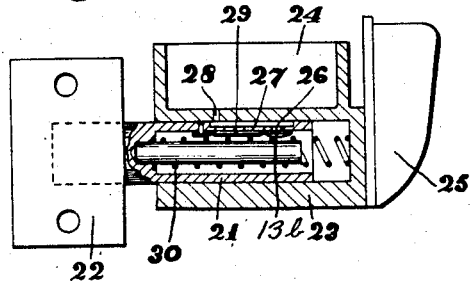
Inventor
Cecil Thomas Bayliss
By
Patent Agent

United States Patent Office 2,893,255
Patented July 7, 1959

2,893,255
CHAIN OR BELT TENSIONING DEVICES

Cecil Thomas Bayliss, Tyseley, Birmingham, England, assignor to Perry Chain Company Limited, Birmingham, England, a British company Application May 9, 1957, Serial No. 658,069

Claims priority, application Great Britain June 7, 1956

7 Claims. (Cl. 74—242.8)

This invention relates to means for tensioning chains or belts, such means being of that kind wherein a spring-influenced plunger or piston located within a cylinder carries or operates a slipper or part which is arranged to be pressed against the chain or belt, the plunger or piston being prevented from being moved back from an operative position, except for a limited amount, by fluid, such as oil, which is allowed to enter the cylinder behind the plunger or piston. The object of the invention is to provide a chain or belt tensioning device of this kind of an improved and novel construction.

According to the invention, a chain or belt tensioning device comprises a plunger or piston slidably located within a housing, the one part (either the plunger or piston or the housing) being movable outwards from the other part by a spring to take up slack in a chain or belt, the plunger or piston having an aperture or passage in communication with a fluid supply and with the interior of the housing and controlled by a clack-valve, or by a hinged or flexible part, the clack-valve, or the hinged or flexible part, allowing liquid from the liquid supply to pass through the aperture or passage into the housing behind or in front of, the plunger or piston when the spring-influenced movable part moves outwards, but being caused by the pressure of the liquid, on an attempted inward movement of the said spring-influenced part, to close the said aperture or passage to prevent escape of liquid or a material quantity of the liquid, from the housing and thus prevent the spring-influenced movable part from moving back into the housing, or from moving back into the latter to any appreciable extent. Preferably, the plunger or piston is moved outwards by the spring, the housing being fixed to a suitable support. The aperture in the piston or plunger, which may be hollow and open at one end, may be in communication with a hole in the bottom of an oil reservoir forming part of the plunger or piston housing, and the clack-valve may conveniently be in the form of a blade located within the hollow part of the piston, being pressed over the aperture, to close the latter, by the liquid in the cylinder by any tendency for the piston to move back into the latter.

Figure 1 of the accompanying drawings represents a side elevation of a chain tensioning device constructed in accordance with this invention, and shown in position for tensioning the valve timing chain of an internal combustion engine, the movable chain tensioning part being prevented from moving back by oil fed from a reservoir forming part of the device.

Figure 4 represents a vertical cross-section on the line IV—IV, Figure 3.

Figures 5 and 6 represent respectively, upon a larger scale, a plan and side view of the spring blade which forms the clack-valve; whilst Figure 7 is a cross-section on the line VII—VII, Figure 5.

Figures 8 and 9 show two modified embodiments of the invention.

Figure 10 shows a further modified embodiment wherein the housing carrying the oil reservoir is movable, whilst the piston or part upon which it is mounted is fixed.

Figure 1:
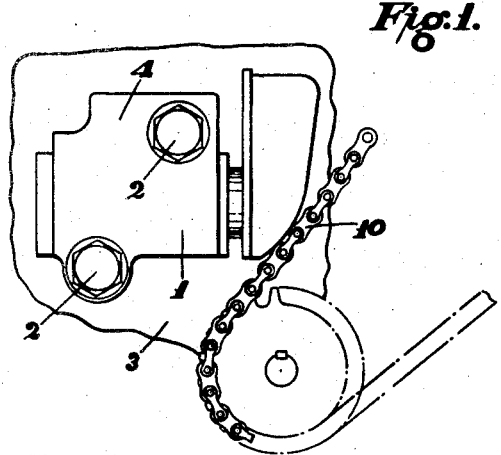
Figure 2:
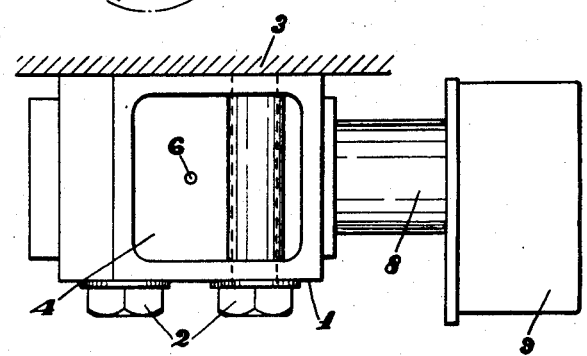
Figure 2 represents a plan view of the device upon a larger scale, with the chain-engaging part moved further outwards.
Figure 3:
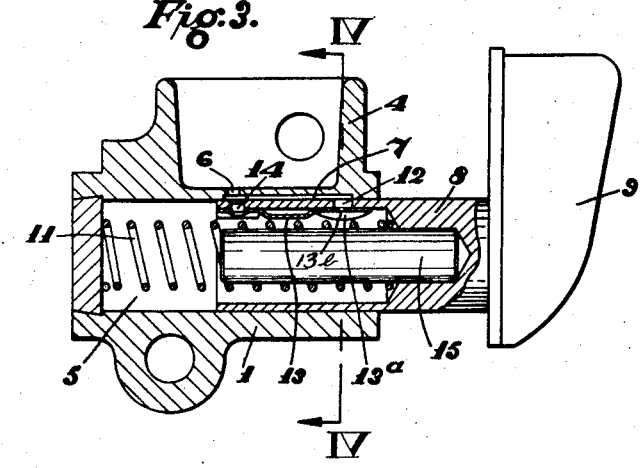
Figure 3 is a vertical section through the device, showing the piston or plunger and the housing carrying the oil reservoir.

Referring to Figures 1 to 7 of the drawings, the improved chain tensioning device consists of a metal housing 1 intended to be fixed, such as by bolts 2, to a wall 3 of the engine crankcase, which may be the timing chain cover, and formed at the upper portion of the housing 1, so as to be integral therewith, is an oil reservoir 4. The housing 1 is provided immediately below the oil reservoir 4, with a cylindrical housing compartment or space 5 disposed horizontally and open at one end, whilst formed in the bottom of the oil reservoir 4 is an aperture 6 adapted to be placed in communication with the interior of the said housing through a longitudinal groove or channel 7 in the latter (see Figure 3). Slidably mounted within the housing compartment 5, and closely fitting the same, is a plunger or piston 8. The latter is of a hollow tubular construction, open at its inner end, as shown, its opposite or outer end, which carries a slipper 9 for engaging the chain 10 to be tensioned, projecting out from the housing. This plunger or piston 8 is arranged to be forced outwards from the housing 1 to cause the slipper 9 to be pressed against the chain by a coiled compression spring 11 located within the hollow tubular end of the plunger or piston, one end of the spring 11 acting on the latter and its opposite or inner end bearing against the closed end of the cylindrical housing compartment 5. Formed in the upper side of the annular wall of the hollow plunger or piston 8 is an aperture 12 (Figure 3), which is disposed opposite the channel 7 in the bottom of the oil reservoir, so that the aperture 12 registers with the said channel and is thus in communication with the aperture 6 in the oil reservoir, during all working positions of the plunger or piston 8 when the device is in normal use. In addition, there is disposed within the hollow plunger or piston 8, between the annular wall of the latter and the coiled spring 11, a flexible steel blade 13 constituting a one-way clack or flap valve. This blade 13 is attached at its one end to the wall of the plunger or piston by a rivet 14, and its opposite end 13ᵃ is of a circular shape, being transversely curved, as shown in Figure 7, to conform with the curvature of the plunger wall. This circular end part 13ᵃ is arranged immediately opposite the aperture 12 in the plunger or piston wall and the arrangement is such that it is caused to close the aperture 12 by the pressure of the oil in the piston or plunger housing if the plunger or piston tends to move back into its housing, but it allows oil to flow down through the aperture 12 if the plunger or piston is moving outwards. The said blade or clack-valve 13 extends along substantially the entire length of the hollow portion of the plunger or piston 8, and the coiled spring 11 is threaded over a central pin 15 which is a press fit into a recess in the plunger or piston, the pin preventing the spring from getting in the way of the clack-valve 13 and thus preventing it from functioning.

When the device is in use, the reservoir 4 is maintained full of oil by oil flung up by the crankshaft of the engine and by oil flung from the valve timing chain, and the spring blade or clack-valve 13 is allowed to fall down slightly away from the aperture 12 as the plunger or piston 8 moves outwards under the influence of the coiled spring 11 to move the slipper 9 up against the timing chain. The result is that oil from the reservoir 4 then flows down by gravity and into a partial vacuum caused by the piston moving outwards, the oil being forced in by atmospheric pressure through the apertures 6 and 12 so that it entirely fills the space 5 behind the plunger or piston 8. Any attempt now to move the plunger or piston 8 back into the housing causes the oil in the space 5 to force the end 13ª of the clack-valve 13 closely up against the inner face of the plunger or piston wall, so that it seals the aperture 12 and the oil within the housing cannot thus escape back into the oil reservoir 4, excepting possibly a very limited amount which passes back through the said aperture before the clack-valve has fully closed. This slight escape of the oil is, however, not a disadvantage since it permits of a slight return movement of the piston, so that if the sprocket wheel of the timing chain is not properly mounted, and is, for example, slightly eccentric, no damage will be done to the tensioning device or to the chain. When the plunger or piston 8 moves further outwards, due to further slackening of the chain, the clack-valve 13 will fall down slightly and allow more oil to flow from the reservoir 4 into the space behind the plunger or piston, thus retaining the latter in its new position except for a possible slight return movement.

Instead of the groove 7 being formed in the housing 4, as shown, it may be formed in the outer face of the wall of the tubular part of the plunger or piston 8, so as to maintain the two apertures 6 and 12 in communication with one another throughout the working stroke of the plunger or piston.

If desired, the free end of the clack-valve 13 may be formed with a very small calibrated hole 13ᵇ arranged to permit of a very small quantity of the oil to escape from the cylinder and thus allow of a slight return movement of the plunger or piston.

Instead of the slipper 9 being fixed to the plunger or piston it may be pivoted at one end to a fixed part, the plunger or piston engaging the slipper and moving it angularly to tension the chain when the said plunger or piston is moved outwards by the spring. Also, if desired, the oil reservoir may be replenished by an extension pipe of the oil lubrication system, the pipe communicating with an aperture in the side of the reservoir, or having its end disposed above the latter.

In the arrangement shown in Figure 8 of the drawings, the plunger or piston 8 is arranged to move a sprocket wheel 16 against the chain to tension the latter, instead of forcing a slipper against the chain as in the preceding arrangement. In this construction the sprocket wheel 16, which acts as a jocket pulley, is rotatably mounted on a carrier 17 slidably supported by the plunger or piston housing 1 which is combined with an oil reservoir 4 as in the previous arrangement, the plunger or piston 8 being pressed outwards by a spring 11 and the space 5 behind the plunger or piston being supplied with oil through the apertures 6 and 12, the aperture 12 being controlled by a clack-valve 13 which functions as previously described.

The construction in Figure 9 embodies two parallel spring-pressed plungers 8 and 8ª each slidable in a separate cylinder in a housing block 18, the latter supporting a slide 19 carrying a rotatably-mounted sprocket member 20 with three rings of teeth for engaging a triple chain. The functioning of the device is the same as in Figure 8, the housing 18 having an oil reservoir 4 which is in communication with spaces behind the pistons 8 and 8ª through apertures controlled clack-valves 13 and 13ª in the respective pistons, so that the latter, forced outwards by springs to move the sprocket member 20 against the chains, are prevented from returning, at least to any material extent.

Figure 10 of the drawings illustrates a reverse arrangement. In this construction a plunger or rod 21 is disposed horizontally and is fixed to a suitable support, such as to a wall of an engine crankcase, by an attachment plate 22. The housing 23, which carries an oil reservoir 24, on the other hand, is movable outwards along the plunger or rod 21 by a spring 30 and carries a slipper 25 for engaging and tensioning a chain, or a belt. As before, the plunger is of a hollow or tubular formation at one end and is formed in its wall with an aperture 26 communicating through a groove 27 with an aperture 28 in the bootom of the oil reservoir. The aperture 26, as in the previous constructions, is controlled by a clack-valve 29 which prevents the housing 23 and the slipper 25 from moving back to any appreciable extent.

Although the invention has been particularly described in connection with a valve timing chain of an internal combustion engine, the improved tensioning device may obviously be applied to other chains, or to belts, and any suitable fluid may be used.

I claim:

1. A chain or belt tensioning device comprising a housing, a plunger slidably disposed within the housing, a recess in the rear end of the plunger, a spring in the housing operating to force the plunger outwards to tension the chain or belt; a liquid supply reservoir, a liquid supply aperture in the reservoir, an aperture in the wall of the plunger recess in communication with the supply reservoir aperture during all operative positions of the plunger, a clack-valve in the plunger recess controlling the flow of liquid through the said apertures into a space behind the plunger, so that the said space is kept filled with liquid as the plunger moves outwards, the liquid in the said space preventing any material return movement of the plunger, and a calibrated aperture in the clack-valve permitted of a slight escape of the liquid and a slight predetermined return movement of the plunger.

2. A chain or belt tensioning device comprising a first member forming a housing, a second member forming a plunger having an aperture and being arranged within said housing, a spring operating to force one of said members outwards relative to the other member to exert pressure against and tension a chain or belt, said housing being provided with an aperture for admitting liquid into said housing and through the aperture in said plunger to a space behind the chain or belt tensioning part which is pressed outwards by said spring, and a clack-valve controlling the passage of liquid through the aperture in said plunger, a calibrated liquid-escape hole in the clack-valve, the latter valve allowing an increasing amount of liquid to be admitted into the housing to fill the space behind the outwardly-movable chain or belt tensioning part, as the latter moves outwards, but preventing the return of the liquid except to an extent permitted by the calibrated orifice the liquid preventing the return to any appreciable extent of the outwardly-pressed chain or belt tensioning part.

3. A chain or belt tensioning device comprising a first member forming a housing, a second member forming a plunger arranged within said housing and having a recess therein with an aperture in the wall of said recess, a spring operating to force one of said members outwards relative to the other member to exert pressure against and tension a chain or belt, said housing having an aperture communicating with the aperture in the wall of said plunger recess for admitting liquid into said housing to a space behind the chain or belt tensioning part which is pressed outwards by said spring, and a clack-valve in said plunger recess controlling the passage of liquid through the aperture in the wall of said plunger recess, a calibrated liquid escape in the clack-valve, the valve allowing an increasing amount of liquid to be admitted into said housing to fill the space behind the outwardly-movable chain or belt tensioning part, as the latter moves outwards, but preventing the return of the liquid excepting such as may pass back through the calibrated hole, and preventing the return to any appreciable extent of the outwardly-pressed chain or belt tensioning part.

4. A chain or belt tensioning device comprising a housing, a plunger slidably disposed within said housing and having an aperture, a spring operating to force said plunger partly out of said housing to tension the chain or belt, said housing having an aperture forming the sole means for admitting liquid into said housing and through the aperture in said plunger to a space behind said plunger, a one-way clack-valve controlling the passage of liquid through the aperture in said plunger into the space behind said plunger, and a calibrated liquid-escape hole in the clack-valve.

5. A chain or belt tensioning device comprising a housing, a plunger slidably disposed within the housing, a space in the housing behind the plunger, a spring operating to force the plunger partly out of the housing to tension the chain or belt, a liquid supply reservoir carried by the housing, said plunger housing having a liquid supply aperture opening into the liquid supply reservoir, said plunger having an aperture in communication with the plunger housing aperture during all operative positions of the plunger, so that liquid may pass from the liquid supply reservoir to a space behind the plunger, a non-return clack-valve, a calibrated liquid-escape aperture in the clack-valve, the clack-valve aperture permitting the flow of liquid from the liquid supply reservoir, through the plunger housing aperture and plunger aperture to the space behind the plunger to fill the said space, but preventing its return therefrom, excepting such liquid as may escape through the calibrated aperture, so that the return of the chain or belt tensioning part is prevented to any appreciable extent.

6. A chain or belt tensioning device comprising a housing, a fixed plunger in the housing, a recess in the front end of the plunger, a spring in the housing operating to force the latter outwards to tension a chain or belt, a liquid supply reservoir on the housing and movable therewith, said reservoir having a liquid supply aperture opening into said plunger housing, the wall of said plunger recess having an aperture in communication with said supply reservoir aperture during all operative positions of said housing, a clack-valve in the plunger recess controlling the flow of liquid through the said apertures into a space in front of said plunger, so that the said space is kept filled with liquid as the housing moves outwards, a calibrated liquid-escape aperture in the clack-valve, the clack-valve aperture preventing the return of the liquid excepting such as may escape through the calibrated aperture and preventing any material return movement of the said housing.

7. A chain or belt tensioning device comprising a first member forming a housing, a second member forming a tubular plunger arranged within said housing and having an aperture in its tubular wall, said plunger being open at one end, a spring engaging within said plunger and operating to press one of said members outwards relative to the other member to exert pressure against and tension a chain or belt, said housing being provided with an aperture for admitting liquid into the housing, and through the aperture in the tubular plunger wall behind the spring-pressed chain or belt tensioning part, the said apertures being in communication with one another during the whole of the working outward movement of the chain or belt tensioning part, a clack-valve disposed lengthwise within the tubular plunger, between the spring and the plunger wall the said clack-valve being secured at one end to the plunger wall, with its outer end covering the liquid inlet aperture in the said wall, a calibrated liquid-escape aperture in the said outer end of the clack-valve, the clack-valve aperture allowing an increasing amount of liquid to be admitted into the housing to fill the space behind the chain or belt tensioning part, as the plunger moves outwards, but preventing the return of the liquid, excepting for liquid escaping through the calibrated aperture, thereby preventing the return to any appreciable extent of the outwardly-pressed chain or belt tensioning part.

References Cited in the file of this patent

FOREIGN PATENTS

| | | |
|---|---|---|
| 336,737 | Great Britain | Oct. 23, 1930 |
| 849,938 | Germany | Sept. 18, 1952 |
| 474,889 | Italy | Oct. 3, 1952 |